(12) United States Patent
Chernov et al.

(10) Patent No.: US 11,193,617 B2
(45) Date of Patent: Dec. 7, 2021

(54) QUICK CONNECT FITTING KIT FOR A PLUMBED APPLIANCE

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 522 days.

(21) Appl. No.: 16/106,212

(22) Filed: Aug. 21, 2018

(65) Prior Publication Data
US 2020/0063903 A1    Feb. 27, 2020

(51) Int. Cl.
| F16L 21/06 | (2006.01) |
| F16L 37/133 | (2006.01) |
| F16L 37/084 | (2006.01) |
| C02F 1/00 | (2006.01) |

(52) U.S. Cl.
CPC ............. *F16L 37/133* (2013.01); *F16L 21/06* (2013.01); *F16L 37/0847* (2013.01); *C02F 1/001* (2013.01); *C02F 2201/004* (2013.01)

(58) Field of Classification Search
CPC ..... F16L 37/133; F16L 37/0847; F16L 21/06; F16L 19/065
USPC ................................................. 285/322, 249
See application file for complete search history.

(56) References Cited

U.S. PATENT DOCUMENTS

| 2,313,780 A | * | 3/1943 | Snyder | .................. H01R 13/59 285/116 |
| 9,234,617 B2 | | 1/2016 | Cai et al. | |
| 2003/0197380 A1 | * | 10/2003 | Chelchowski | ........ F16L 19/065 285/354 |

FOREIGN PATENT DOCUMENTS

| CN | 201135824 Y | | 10/2008 |
| FR | 681127 A | * | 5/1930 |
| GB | 190926909 A | * | 2/1910 |
| GB | 621908 A | * | 4/1949 |
| KR | 101300365 B1 | | 8/2013 |

* cited by examiner

*Primary Examiner* — Matthew Troutman
*Assistant Examiner* — James A Linford
(74) *Attorney, Agent, or Firm* — Dority & Manning, P.A.

(57) ABSTRACT

A quick connect fitting kit includes a chuck having a threaded end. The chuck defines a channel. A collar has a threaded end and a sloped inner surface. The threaded end of the collar is meshable with the threaded end of the chuck to mount the collar to the chuck. A collet has a sloped outer surface. The collet is positioned within the collar such that the sloped outer surface of the collet is positioned on the sloped inner surface of the collar. The collet defines a passage. The passage of the collet is sized for receipt of a pipe. The pipe is in fluid communication with the channel of the chuck when the collet is compressed against the pipe and the collar is mounted to the chuck.

17 Claims, 10 Drawing Sheets

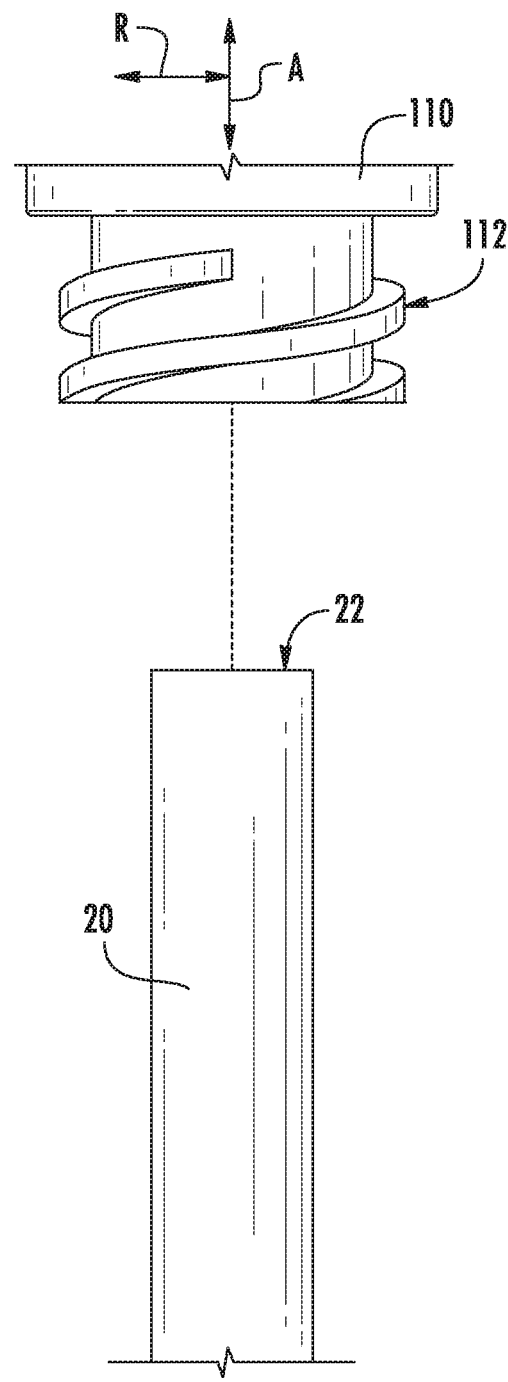
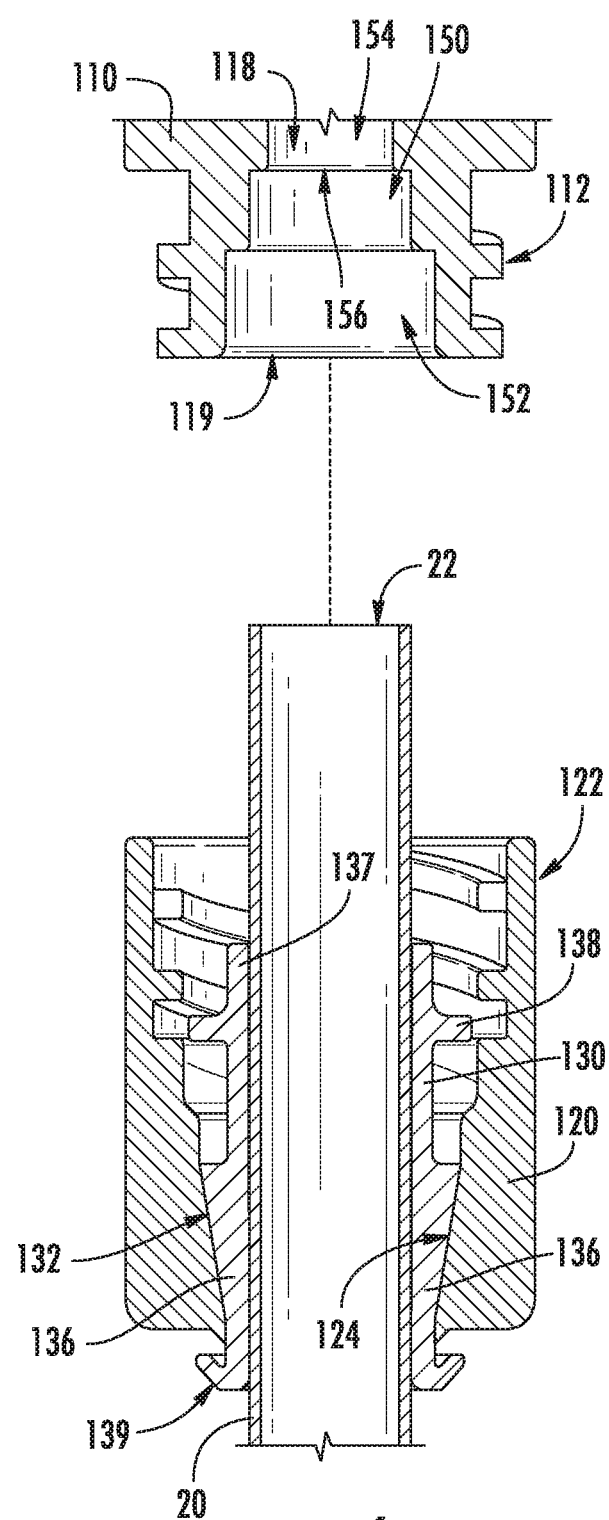
FIG. 5
FIG. 6

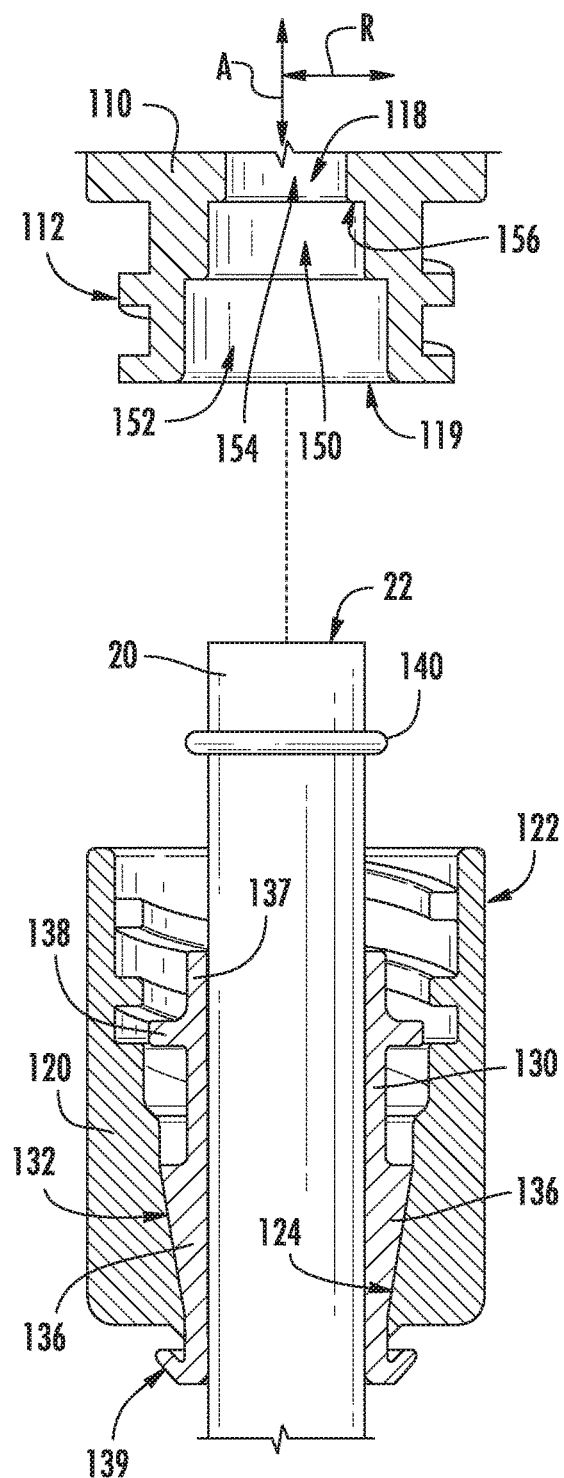
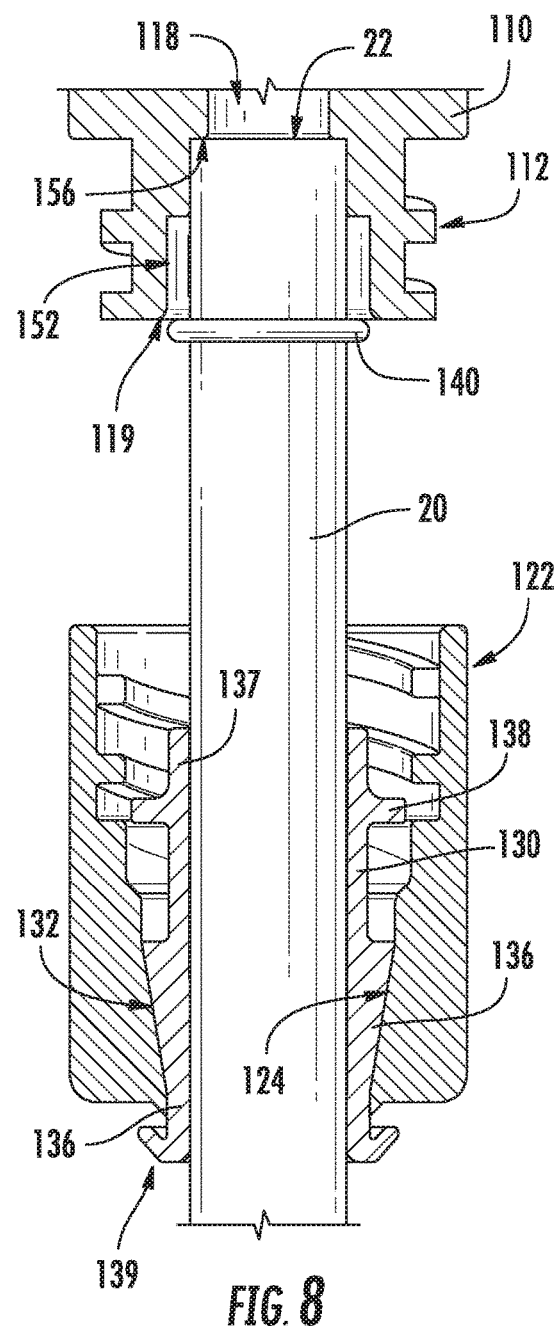
FIG. 7
FIG. 8

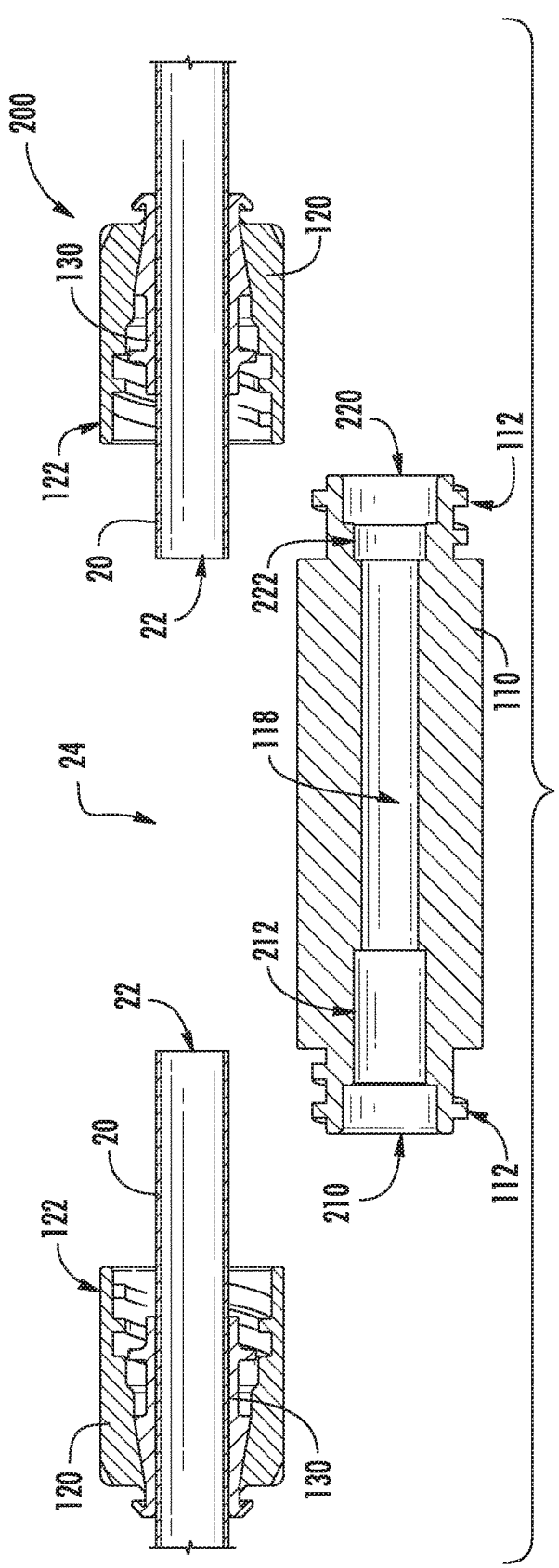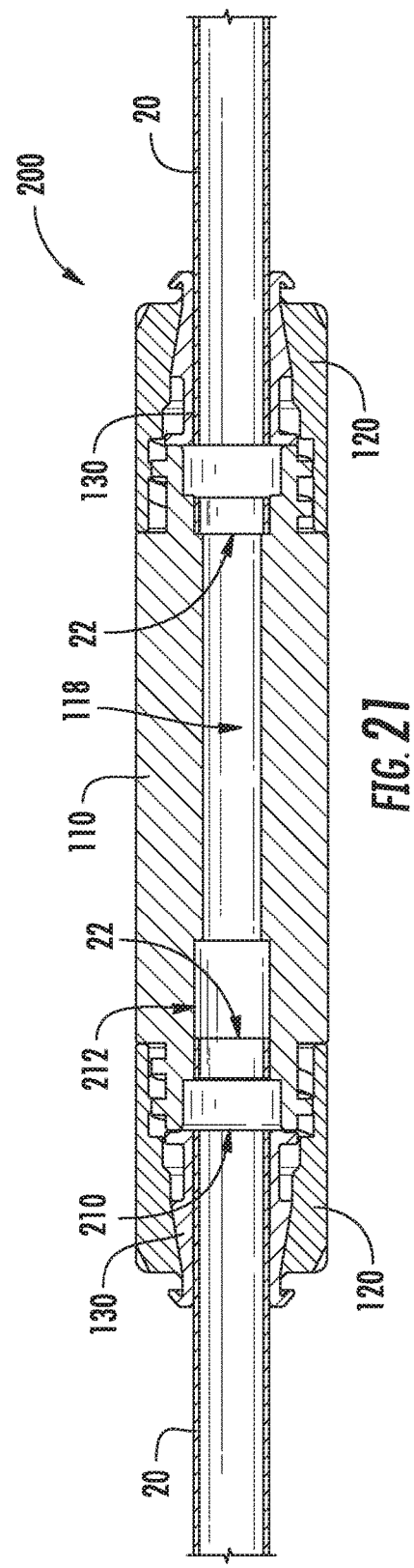

QUICK CONNECT FITTING KIT FOR A PLUMBED APPLIANCE

FIELD OF THE INVENTION

The present subject matter relates generally to fittings for connecting plumbed appliances to water lines.

BACKGROUND OF THE INVENTION

Water filters are generally divided into two classes: point of entry water filters and point of use water filters. Point of entry water filters can be installed on a water line in order to filter water flowing through the water line into a building or residence. Thus, point of entry water filters can provide filtered water throughout the building or residence.

Installing water filters on the water line can be difficult. For example, known water filters require time consuming operations, such as cutting and brazing joints on copper water lines or cutting or gluing joints on PVC water lines.

BRIEF DESCRIPTION OF THE INVENTION

Aspects and advantages of the invention will be set forth in part in the following description, or may be apparent from the description, or may be learned through practice of the invention.

In a first example embodiment, a quick connect fitting kit includes a chuck having a threaded end. The chuck defines a channel. A collar has a threaded end and a sloped inner surface. The threaded end of the collar is meshable with the threaded end of the chuck to mount the collar to the chuck. A collet has a sloped outer surface. The collet is positioned within the collar such that the sloped outer surface of the collet is positioned on the sloped inner surface of the collar. The collet defines a passage. The passage of the collet is sized for receipt of a pipe. The pipe is in fluid communication with the channel of the chuck when the collet is compressed against the pipe and the collar is mounted to the chuck.

In a second example embodiment, a quick connect fitting kit includes a chuck having a threaded end. The chuck defines a channel. A collar has a threaded end and a sloped inner surface. The threaded end of the collar is meshable with the threaded end of the chuck to mount the collar to the chuck. The threaded end of the collar is axially spaced from the sloped inner surface of the collar within the collar. A collet has a sloped outer surface. The collet is positioned within the collar such that the sloped outer surface of the collet is positioned on the sloped inner surface of the collar. The collet defines a passage. The passage of the collet is sized for receipt of a pipe. The pipe is in fluid communication with the channel of the chuck when the collet is compressed against the pipe and the collar is mounted to the chuck.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 5 through 13 illustrate the example quick connect fitting of FIG. 1 being mounted on the water line.

FIG. 20 is an exploded section view of a quick connect fitting according to another example embodiment of the present subject matter.

FIG. 21 is a section view of the example quick connect fitting of FIG. 20.

DETAILED DESCRIPTION

Figure 1:
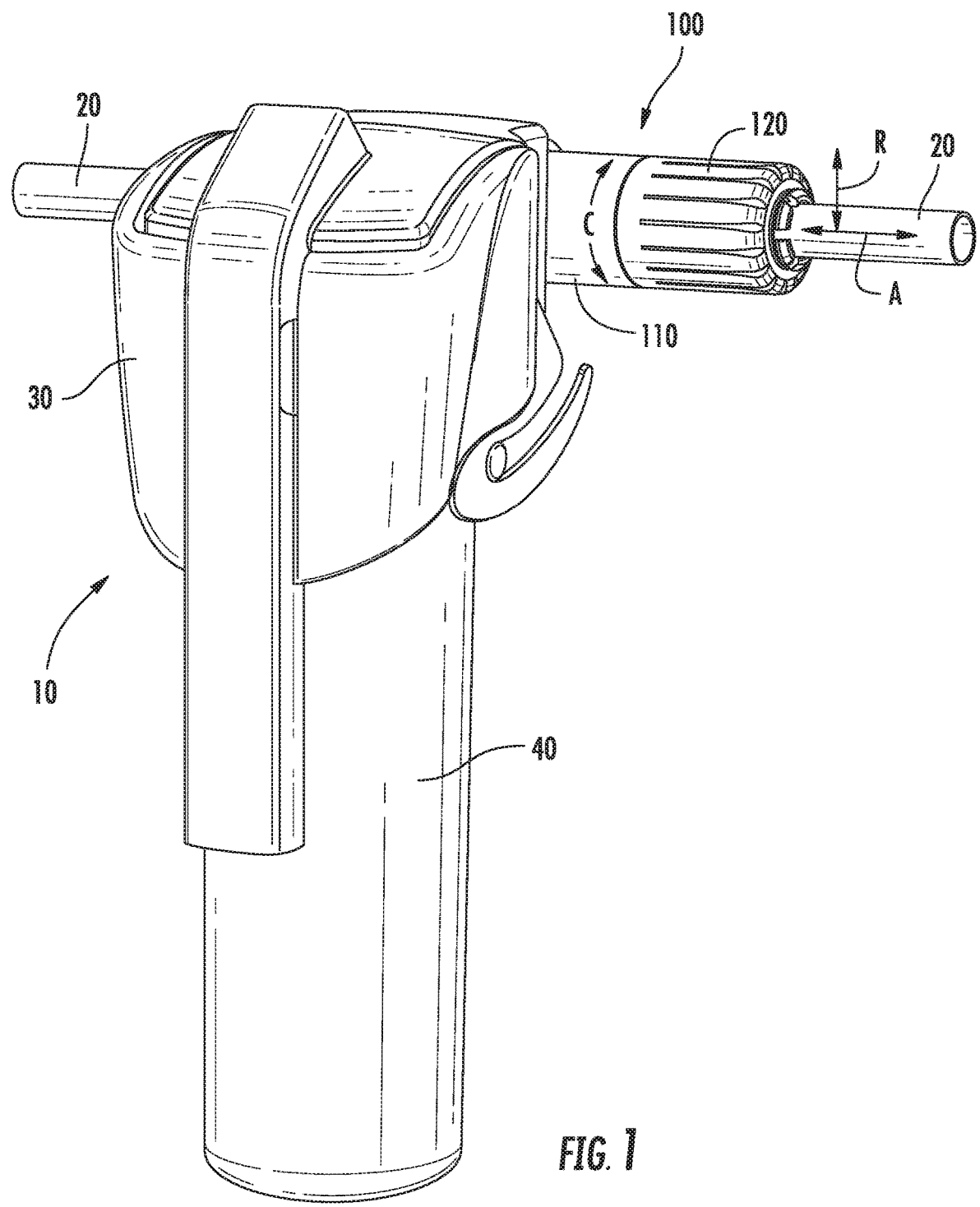
FIG. 1 is a perspective view of a water filter connected to a water line with a quick connect fitting according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of a water filter 10 connected to a water line 20 with a quick connect fitting 100 according to an example embodiment of the present subject matter. Water line 20 may be a pipe, such as a plastic or copper line, for containing a pressurized flow of water. Water line 20 may be in fluid communication with a water source, such as a municipal water supply or well. Thus water line 20 may receive the pressurized flow of water from the water source. Quick connect fitting 100 defines an axial direction A, a radial direction R and a circumferential direction C.

While described below in the context of water filter 10, it will be understood that quick connect fitting 100 may be used to connect any other suitable plumbed appliance to water line 20 in alternative example embodiments. For example, quick connect fitting 100 may be used to connect a single-serve beverage dispenser, a refrigerator appliance, a dishwasher appliance, a washing machine appliance, etc. to water line 20. As discussed in greater detail below, quick connect fitting 100 assists with easily and/or quickly connecting a plumbed appliance to water line 20 relative to known fittings.

As may be seen in FIG. 1, water filter 10 includes a manifold 30 that mounts to water line 20 with quick connect fitting 100. When quick connect fitting 100 couples manifold 30 to water line 20, manifold 30 is in fluid communication with water line 20, e.g., such that unfiltered water from water line 20 is flowable into manifold 30 on one side of manifold 30 and filtered water from manifold 30 is flowable into water line 20 from the opposite side of manifold 30.

A filter cartridge 40 is removably mounted to manifold 30. Filter cartridge 40 includes a filter medium, such as an activated carbon block, reverse osmosis membrane, pleated fiber medium, etc. The filter medium within filter cartridge 40, filters the water flowing through manifold 30. Thus, as described above, filter cartridge 40 may filter the unfiltered water from water line 20 that enters manifold 30 on one side of manifold 30, and the filtered water from filter cartridge 40 may exit manifold 30 into water line 20 on the opposite side of manifold 30. Filter cartridge 40 may be replaced and/or serviced at regular intervals to maintain an efficacy of water filtration with water filter 10.

Figure 2:
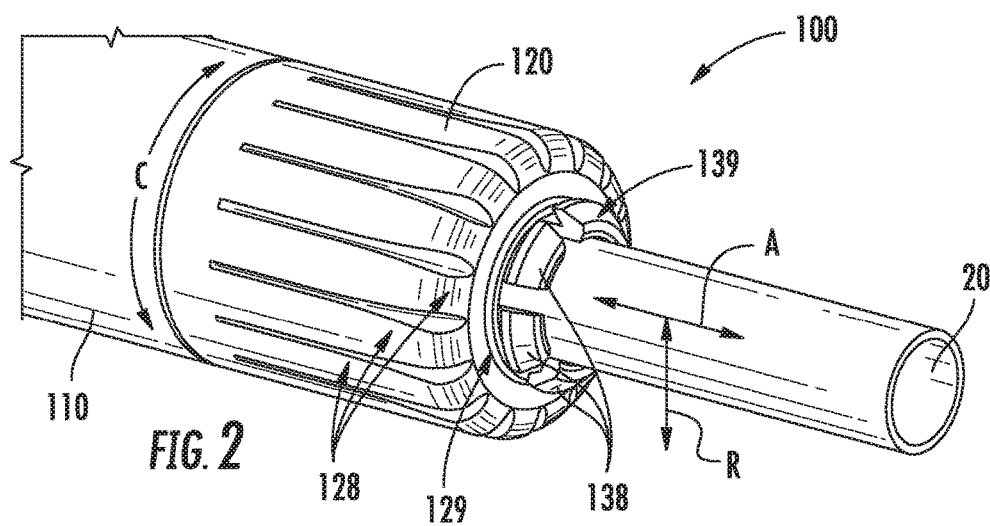
FIG. 2 is a perspective view of the example quick connect fitting of FIG. 1.
Figure 3:
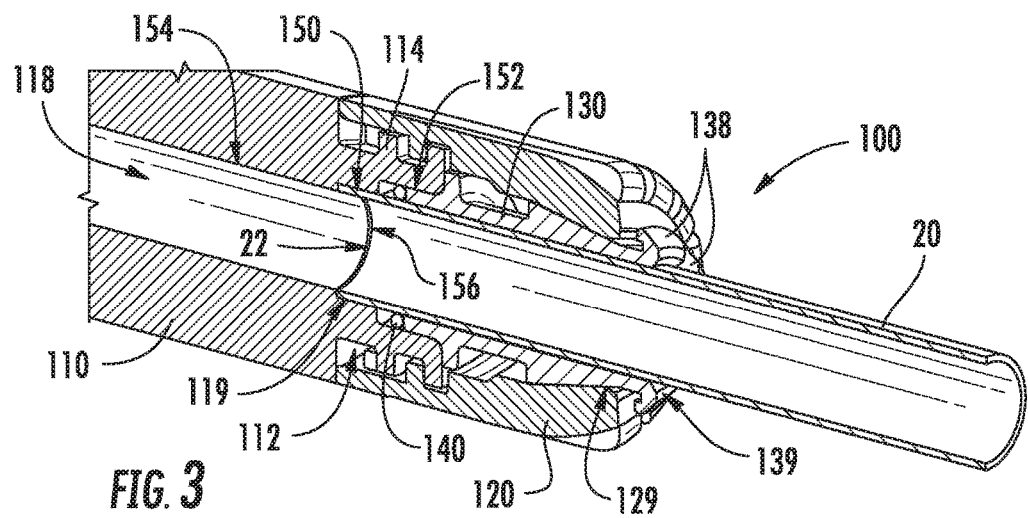
FIG. 3 is a section view of the example quick connect fitting of FIG. 1.
Figure 4:
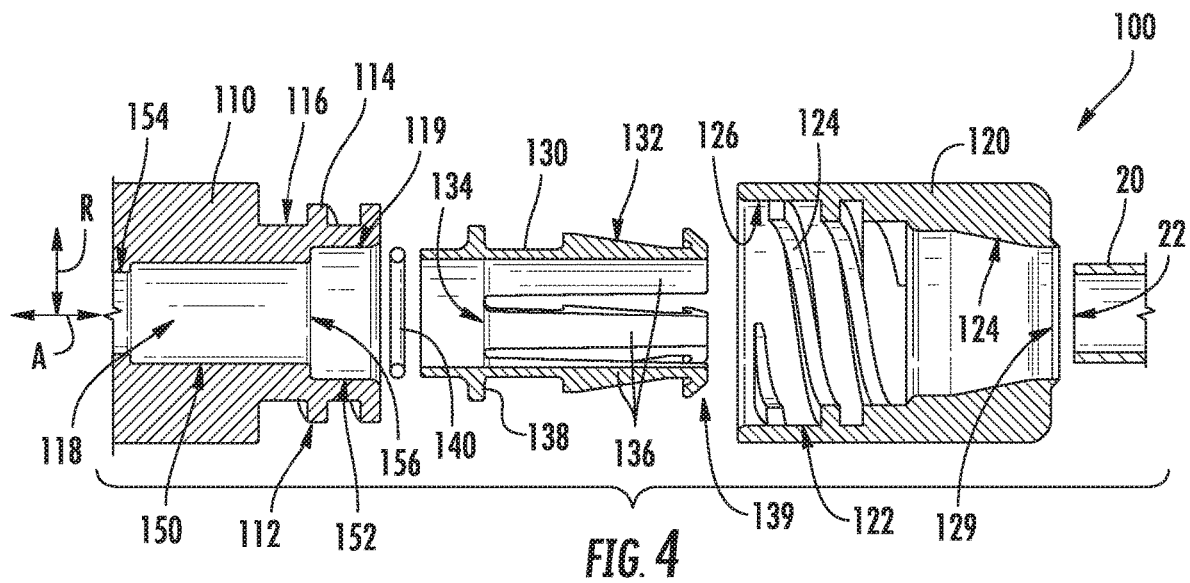
FIG. 4 is an exploded section view of the example quick connect fitting of FIG. 1.

Turning now to FIGS. 2 through 4, quick connect fitting 100 includes a chuck 110, a collar 120 and a collet 130. Chuck 110, collar 120 and collet 130 cooperate to assist with mounting quick connect fitting 100 to water line 20. Utilizing chuck 110, collar 120 and collet 130, installation of quick connect fitting 100 may be relatively quick and easy comparted to known couplings. For example, an unskilled homeowner may be capable of installing quick connect fitting 100 onto water line 20 within a residence.

Chuck 110 has a threaded end 112, and collar 120 also has a threaded end 122. Threaded end 122 of collar 120 is configured to mesh with threaded end 112 of chuck 110 in order to mount collar 120 to chuck 110. Thus, collar 120 may be threaded onto chuck 110. As an example, threaded end 122 of collar 120 may have a thread 124 (e.g., a pair of threads 124) on an inner surface 126 of collar 120. Conversely, threaded end 112 of chuck 110 may have a thread 114 (e.g., a pair of threads 114) on an outer surface 116 of chuck 110. Collar 120 may be threaded onto chuck 110 such that thread 124 of collar 120 meshes with thread 114 of chuck 110. Collar 120 (e.g., an surface of collar 120) may include slots 128 that form a grip for grasping collar 120 as an installer rotates collar 120 onto chuck 110.

Chuck 110 may be mounted to or formed with manifold 30. Thus, chuck 110 may be in fluid communication with manifold 30, e.g., such that liquid water from chuck 110 is flowable into filter cartridge 40 from manifold 30. In certain example embodiments, chuck 110 is integrally formed with manifold 30, e.g., such that chuck 110 and manifold 30 are formed from a single, continuous piece of material, such as molded plastic. In alternative example embodiments, chuck 110 may be indirectly connected to manifold 30 or a suitable plumbed appliance via a pipe, conduit, etc.

Chuck 110 defines a channel 118. Channel 118 may extend longitudinally through chuck 110, e.g., along the axial direction A. Liquid water from water line 20 may flow into channel 118, as described in greater detail below. Thus, e.g., quick connect fitting 100 may be configured to mount water line 20 within chuck 110 such that water line 20 is contiguous and/or in fluid communication with channel 118 of chuck 110. For example, an inlet 119 of channel 118 may be configured for receipt of an end 22 of water line 20. Inlet 119 of channel 118 is positioned inward of threaded end 112 of chuck 110, e.g., along the radial direction R that is perpendicular to the axial direction A.

Inlet 119 of channel 118 may have a first portion 150, a second portion 152 and a third portion 154 that are spaced apart along the axial direction A and have different diameters. First portion 150, second portion 152 and third portion 154 of inlet 119 may also be positioned concentrically with one another and/or be distributed in the sequence second portion 152, first portion 150 and third portion 154 along the axial direction A. Thus, first portion 150 of inlet 119 may be positioned between second and third portions 152, 154 of inlet 119 along the axial direction A.

First portion 150 of inlet 119 may have a diameter that corresponds to water line 20. In particular, a diameter of first portion 150 of inlet 119 may be about equal to (e.g., slightly larger than) the outer diameter of water line 20. Thus, water line 20 may be received within first portion 150 of inlet 119. Second portion 152 of inlet 119 may have a diameter that is larger than the diameter of first portion 150 of inlet 119. Water line 20 may extend through second portion 152 of inlet 119 into first portion 150 of inlet 119. A diameter of third portion 154 of inlet 119 may be less than the diameter of first portion 150 of inlet 119 (e.g., and second portion 152 of inlet 119). Liquid water from water line 20 within first portion 150 of inlet 119 may flow into third portion 154 of inlet 119. An abutment 156 may be formed between first and third portions 150, 154 of inlet 119. End 22 of water line 20 may rest against abutment 156 when water line 20 inserted into first portion 150 of inlet 119. Thus, the diameter of third portion 154 of inlet 119 may be smaller than the outer diameter of water line 20 such that water line 20 does not fit within third portion 154 of inlet 119. In certain example embodiments, the diameter of third portion 154 of inlet 119 may correspond to the inner diameter of water line 20.

Collar 120 has a sloped inner surface 124. Threaded end 122 of collar 120 may be positioned opposite sloped inner surface 124 of collar 120, e.g., along the axial direction A, on collar 120. Thus, threaded end 122 of collar 120 and sloped inner surface 124 of collar 120 may be spaced along the axial direction A within collar 120. Slopped inner surface 124 of collar 120 is configured to engage with collet 130 as discussed in greater detail below.

Collet 130 also has a sloped outer surface 132. Sloped outer surface 132 of collet 130 may be angled and/or oriented in a manner that is complementary to slopped inner surface 124 of collar 120. For, example, sloped outer surface 132 of collet 130 and slopped inner surface 124 of collar 120 may contract at a common rate along the axial direction A, e.g., away from chuck 110. Sloped outer surface 132 of collet 130 may be positioned on and/or slide on slopped inner surface 124 of collar 120. In particular, collet 130 may be positioned within collar 120 such that sloped outer surface 132 of collet 130 is positioned on slopped inner surface 124 of collar 120. Collet 130 also defines a passage 134. Passage 134 of collet 130 may be sized for receipt of water line 20. Thus, e.g., collet 130 may be received on water line 20 by sliding collet 130 onto water line 20 at passage 134.

Collet 130 has a plurality of latching arms 136 and an annular body 138. Latching arms 136 extend along the axial direction A from annular body 138 and are distributed along the circumferential direction C. Sloped outer surface 132 of collet 130 may be defined on latching arms 136. Latching arms 136 may be elastically deformable to assist with mounting collet 130 to collar 120. For example, a distal end portion 139 of each latching arm 136 may deflect inwardly along the radial direction R as distal end portions 139 of latching arms 136 pass through an opening 129 of collar 120. Opening 129 of collar 129 may be circular, and opening 129 of collar 129 may be positioned opposite threaded end 122 of collar 120 on collar 120 along the axial direction A.

After distal end portions 139 of latching arms 136 pass through opening 129 of collar 120, distal end portions 139 of latching arms 136 may deflect outwardly along the radial direction R. Interference between latching arms 136 of collet 130 and collar 120 at opening 129 of collar 120 may mount collet 130 to collar 120.

As discussed in greater detail below, water line 20 may be coupled to quick connect fitting 100 in order to place channel 118 of chuck 110 in fluid communication with water line 20. Water line 20 may be coupled to quick connect fitting 100 when collet 130 is compressed against water line 20 and collar 120 is mounted to chuck 110. An example method for coupling quick connect fitting 100 to water line 20 is described in greater detail in the context of FIGS. 5 through 13.

Turning to FIGS. 5 and 6, collar 120 and collet 130 may be positioned on water line 20. In particular, an installer may slide collar 120 and collet 130 onto water line 20 by inserting water line 20 into passage 134 of collet 130. Thus, the installer may first slide collar 120 and collet 130 onto water line 20. As shown in FIG. 7, an O-ring 140 may then be positioned on water line 20. In particular, the installer may slide O-ring 140 onto water line 20 between chuck 110 and collar 120/collet 130 along the axial direction A. Thus, O-ring 140 may be positioned on water line 20 with collar 120 and collet 130.

Figure 9:
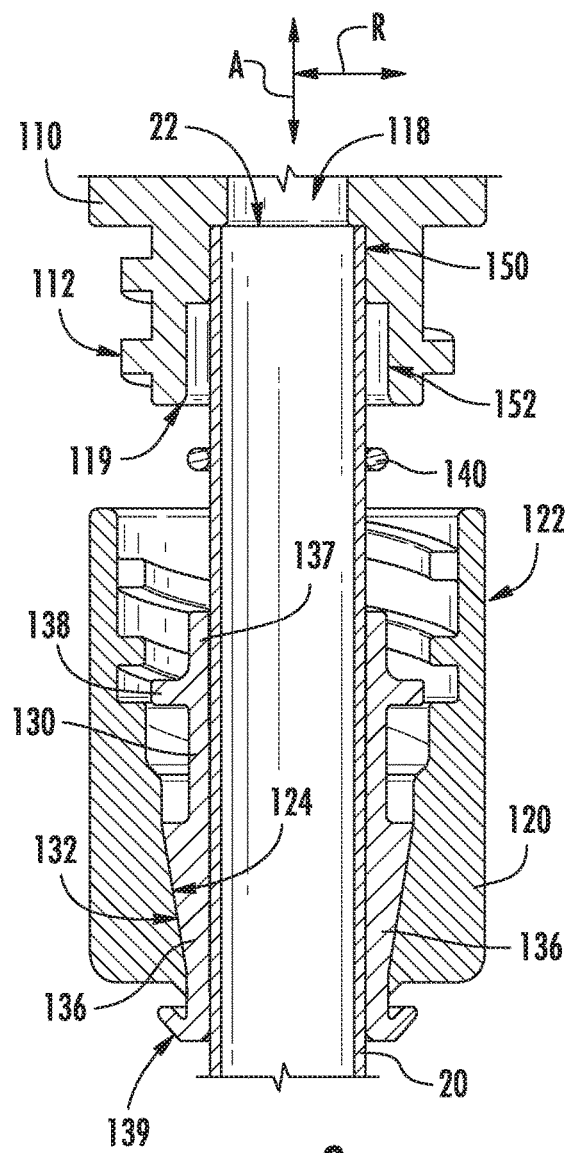
Figure 10:
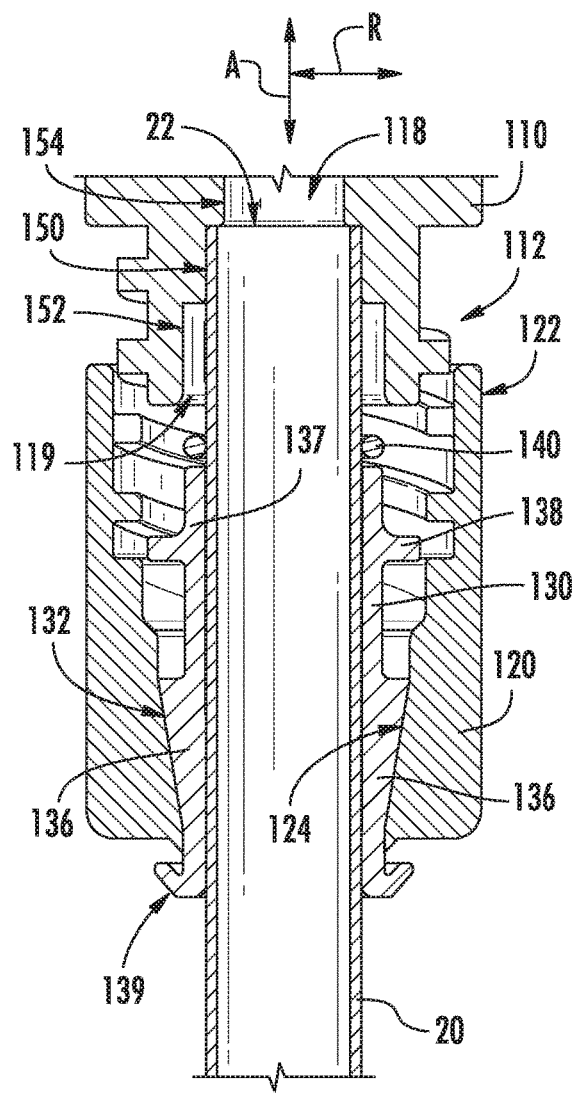

Next, chuck 110 may be positioned on water line 20 as shown in FIG. 8. In particular, the installer may push chuck 110 onto water line 20 such that water line 20 slides into first portion 150 of inlet 119 and end 22 of water line 20 is positioned against abutment 156. Turning to FIGS. 9 and 10, collar 120 and collet 130 may then be moved on water line 20 towards chuck 110. In particular, the installer may push collar 120 and collet 130 along the axial direction A towards chuck 110 until threaded end 122 of collar 120 is positioned proximate threaded end 112 of chuck 110.

Figure 11:
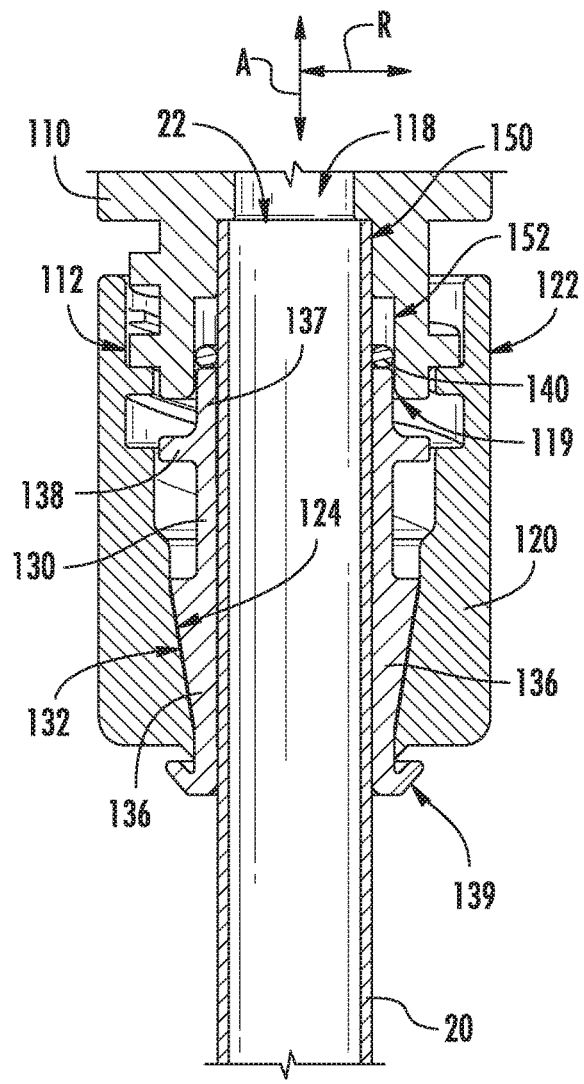
Figure 12:
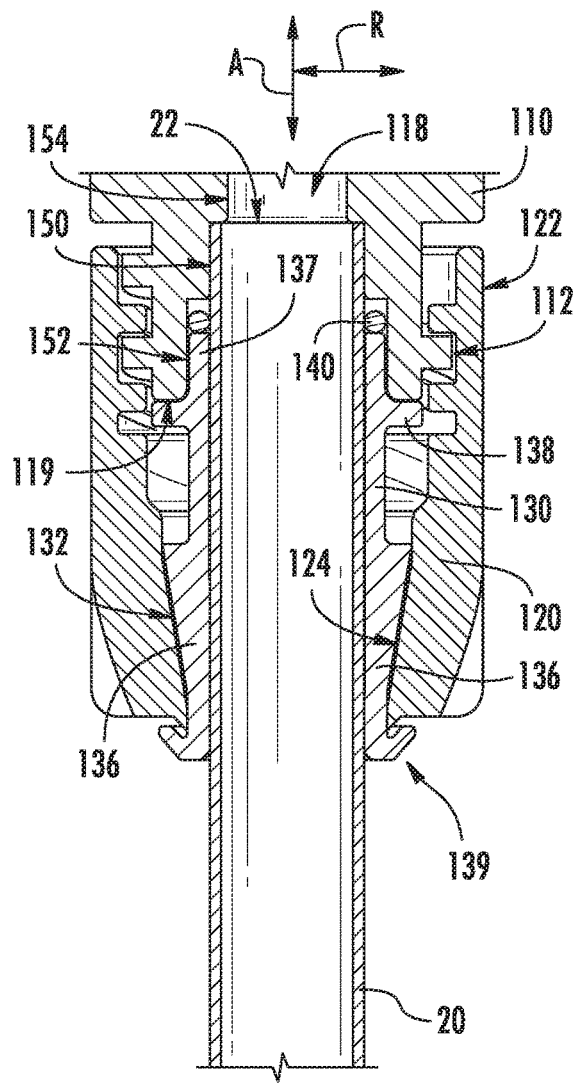
Figure 13:
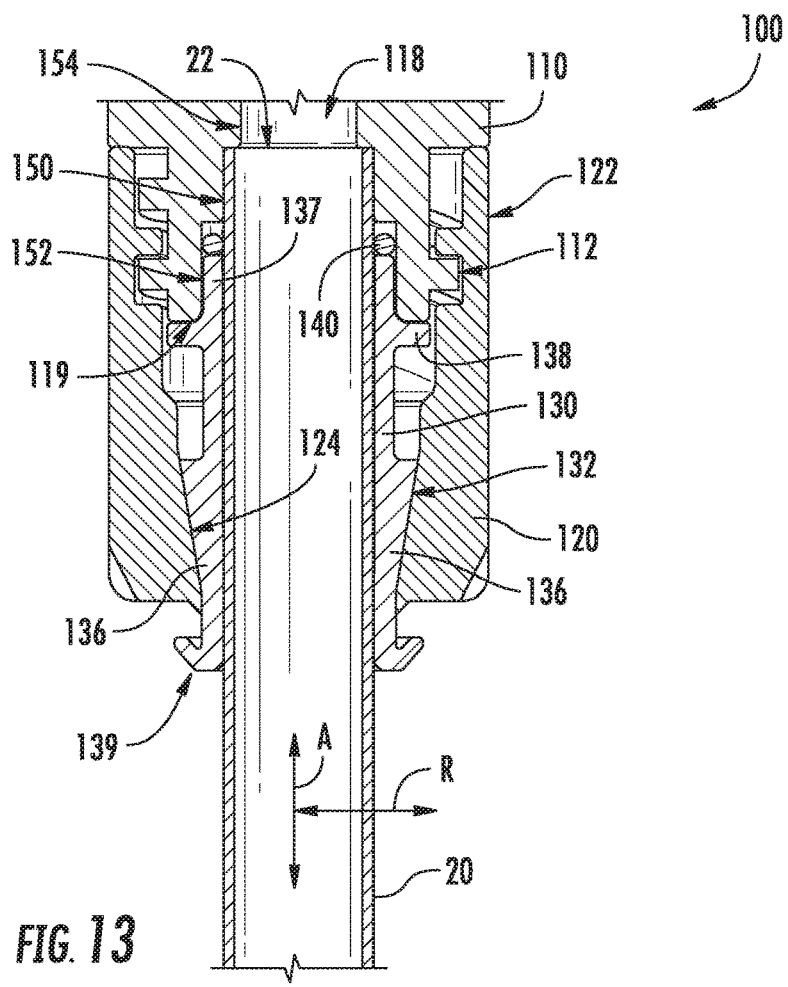

As shown in FIGS. 11 through 13, collar 120 and collet 130 may then be mounted to chuck 110. In particular, the installer may rotate collar 120 and collet 130 relative to chuck 110 (or vice versa) such that threaded end 122 of collar 120 meshes with threaded end 112 of chuck 110. Thus, collar 120 and collet 130 may be mounted to chuck 110 by threading collar 120 to chuck 110.

As collar 120 is threaded onto chuck 110 various features of quick connect fitting 100 cooperate to hold water line 20 within quick connect fitting 100 and/or seal the interface between water line 20 and quick connect fitting 100. Such features are described in greater detail below in the context of FIGS. 10 through 13.

As collar 120 is threaded onto chuck 110, the interface between sloped outer surface 132 of collet 130 and slopped inner surface 124 of collar 120 may cause collet 130 to slide along the axial direction A towards chuck 110. In particular, collet 130 may slide along the axial direction A towards chuck 110 until annular body 138 rests against chuck 110 at inlet 119 of channel 118. When collet 130 is positioned against chuck 110, sloped outer surface 132 of collet 130 and slopped inner surface 124 of collar 120 cooperate to clamp water line 20 within quick connect fitting 100. In particular, as shown in FIGS. 12 and 13, slopped inner surface 124 of collar 120 may slide up sloped outer surface 132 of collet 130 such that latching arms 136 are pressed against water line 20 along the radial direction R as collar 120 is threaded onto chuck 110. In such a manner, latching arms 136 may hold water line 20 within quick connect fitting 100 and prevent retraction of water line 20 along the axial direction A from quick connect fitting 100 after collar 120 is threaded onto chuck 110.

As noted above, O-ring 140 may be positioned on water line 20 with collar 120 and collet 130. When collar 120 is threaded onto chuck 110, collet 130 may assist with properly positioning O-ring 140 within quick connect fitting 100. For example, a post 137 of collet 130 may extend away from annular body 138 along the axial direction A, e.g., opposite latching arms 136. Thus, latching arms 136 may be positioned opposite post 137 on annular body 138 along the axial direction A. Post 137 may be cylindrical in certain example embodiments.

Post 137 of collet 130 may slide into second portion 152 of inlet 119 as collar 120 is threaded onto chuck 110, and post 137 of collet 130 may push O-ring 140 into second portion 152 of inlet 119. Thus, as shown in FIG. 13, O-ring 140 may be positioned between collet 130 and chuck 110 along the axial direction A when collar 120 is mounted to chuck 110. In addition, O-ring 140 may extend along the radial direction R between water line 20 and chuck 110, e.g., in second portion 152 of inlet 119, when collar 120 is mounted to chuck 110. In such a manner, collet 130 may assist with positioning O-ring 140 within quick connect fitting 100 such that O-ring 140 seals the interface between water line 20 and chuck 110.

Figure 14:
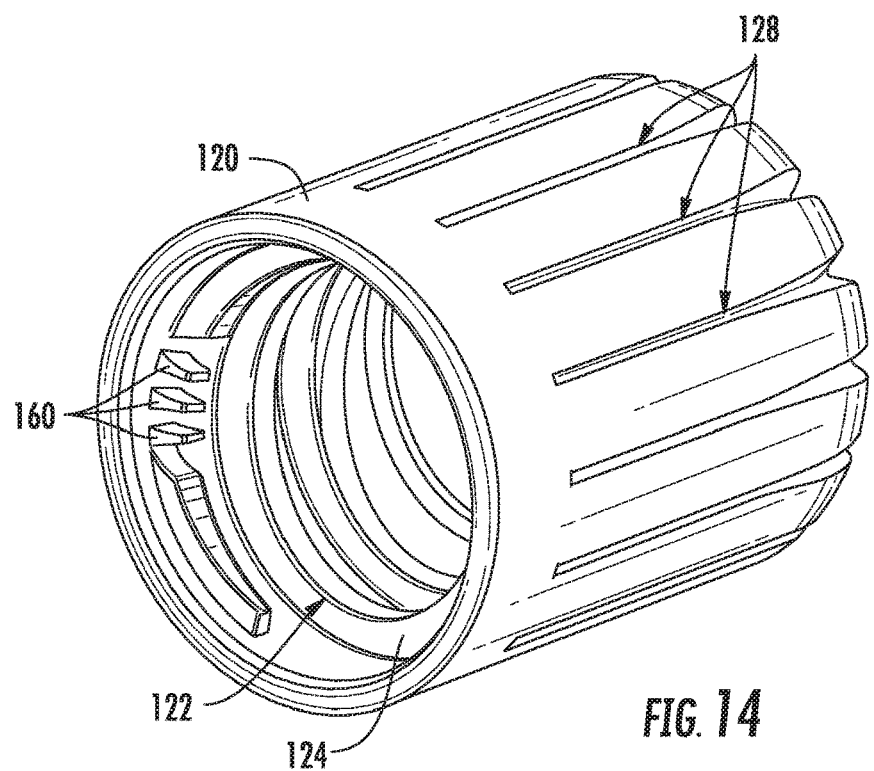
FIG. 14 is a perspective view of a collar of the example quick connect fitting of FIG. 1.
Figure 15:
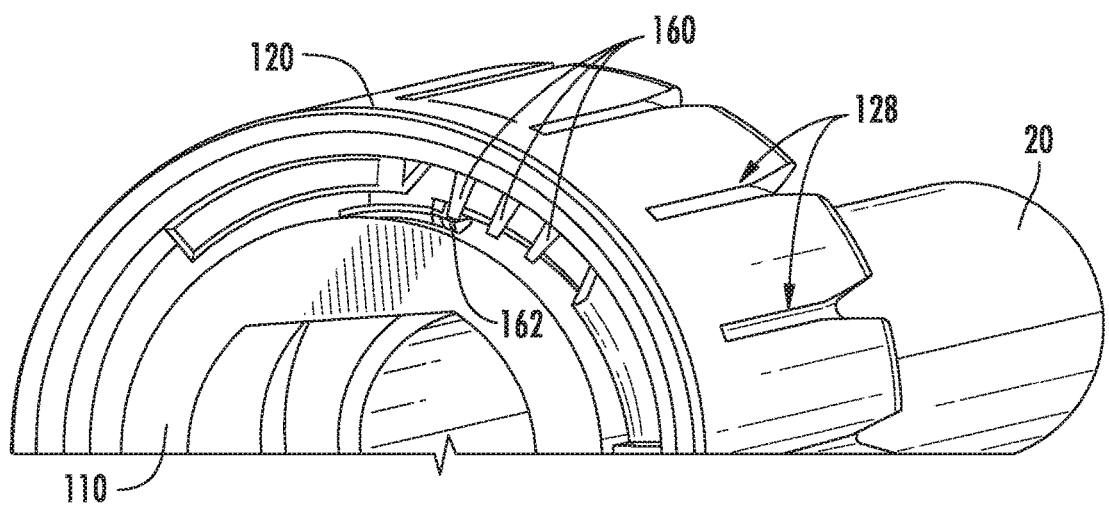
FIG. 15 is a section view of the example quick connect fitting of FIG. 1.

Turning now to FIGS. 14 and 15, quick connect fitting 100 may also include features for alerting an installer when collar 120 is fully threaded onto chuck 110. As may be seen in FIG. 14, collar 120 may have a plurality of feedback pins 160, e.g., threaded end 122 of collar 120. Chuck 110 may also have a post 162 as shown in FIG. 15. Post 162 of chuck 110 clicks past feedback pins 160 of collar 120 as collar 120 mounts to chuck 110. Thus, e.g., when feedback pins 160 have three pins, the installer may hear three clicks after collar 120 is fully threaded onto chuck 110. In such a manner, feedback pins 160 and post 162 may provide audible feedback to the installer during installation of collar 120 onto chuck 110. It will be understood that feedback pins 160 may have any suitable number of pins. In addition, the location of feedback pins 160 and post 162 on chuck 110 and collar 120 may be flipped in alternative example embodiments.

Figure 16:
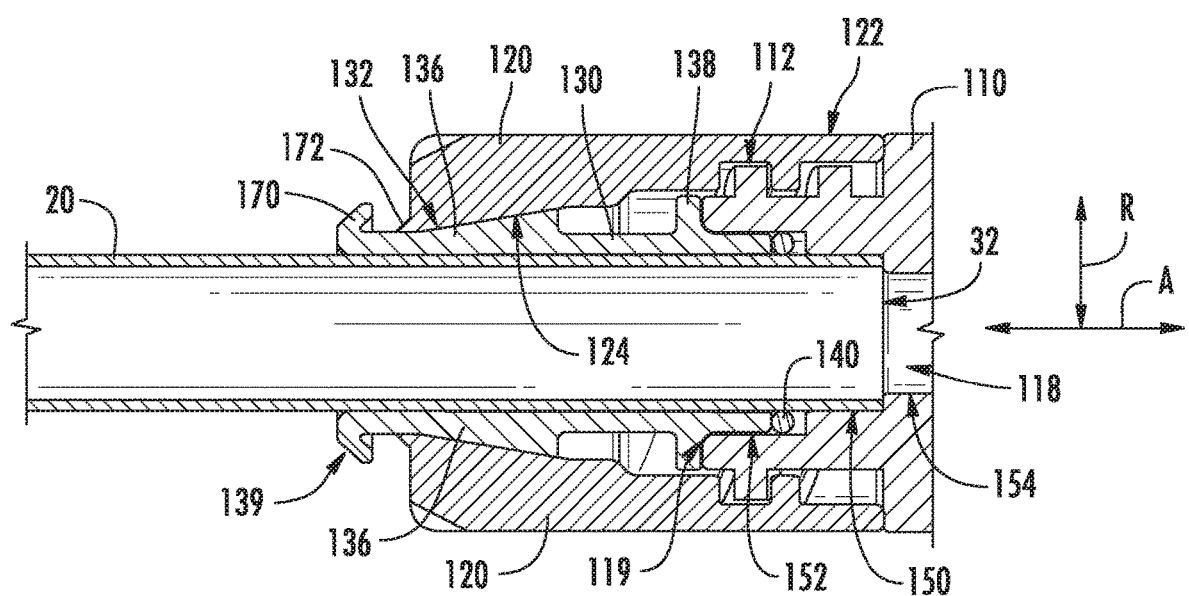
FIG. 16 is a partial section view of the example quick connect fitting of FIG. 1.
Figure 17:
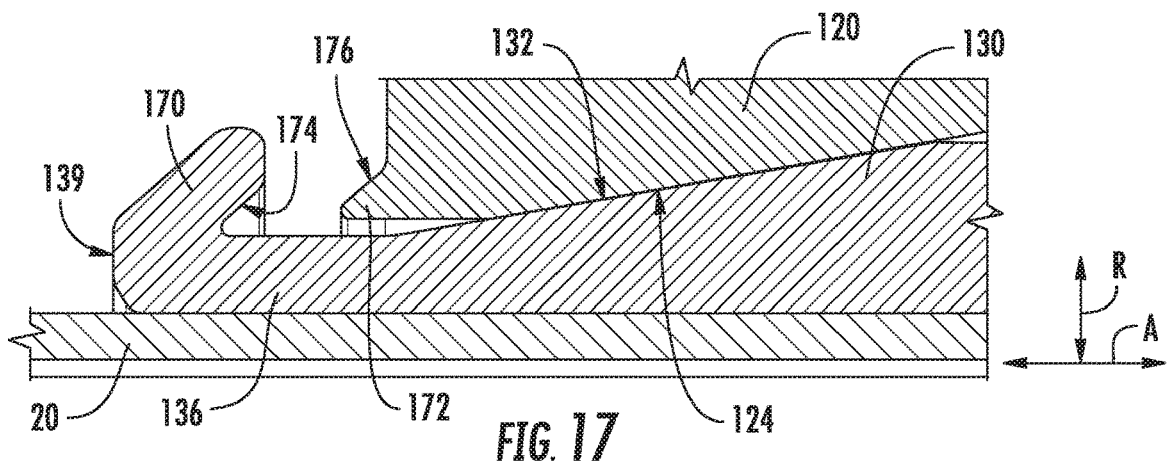
FIG. 17 is a partial section view of a collar and collet of the example quick connect fitting of FIG. 16.
Figure 18:
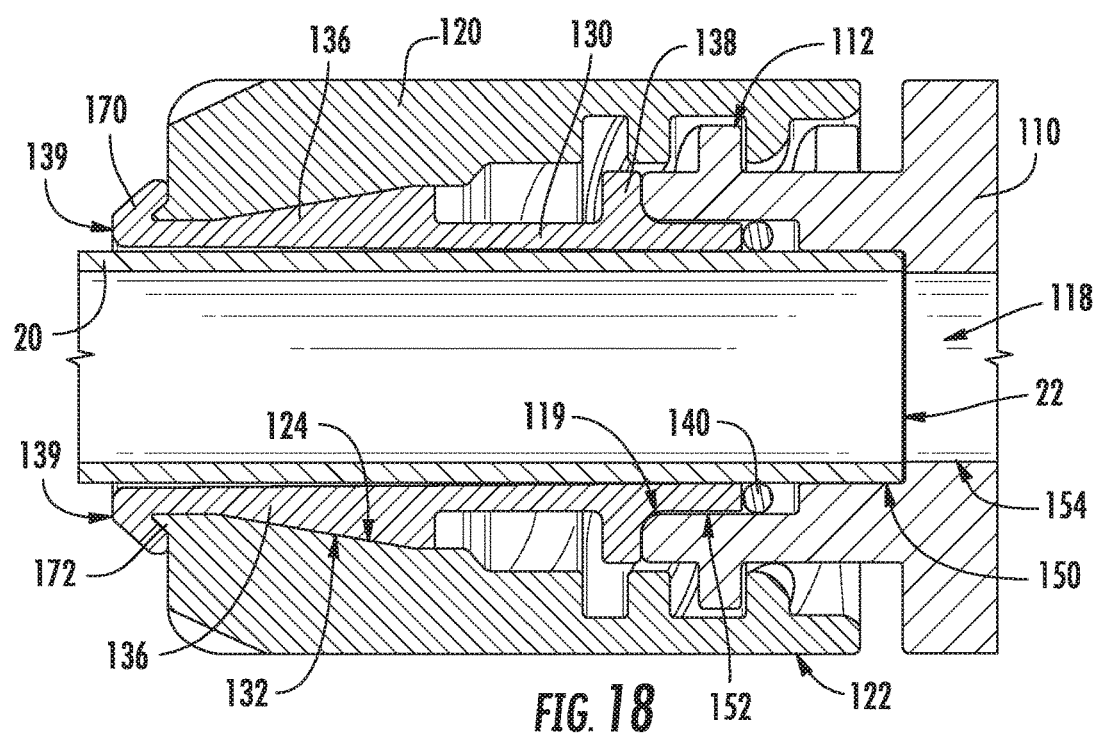
FIG. 18 is a section view of the example quick connect fitting of FIG. 1.
Figure 19:
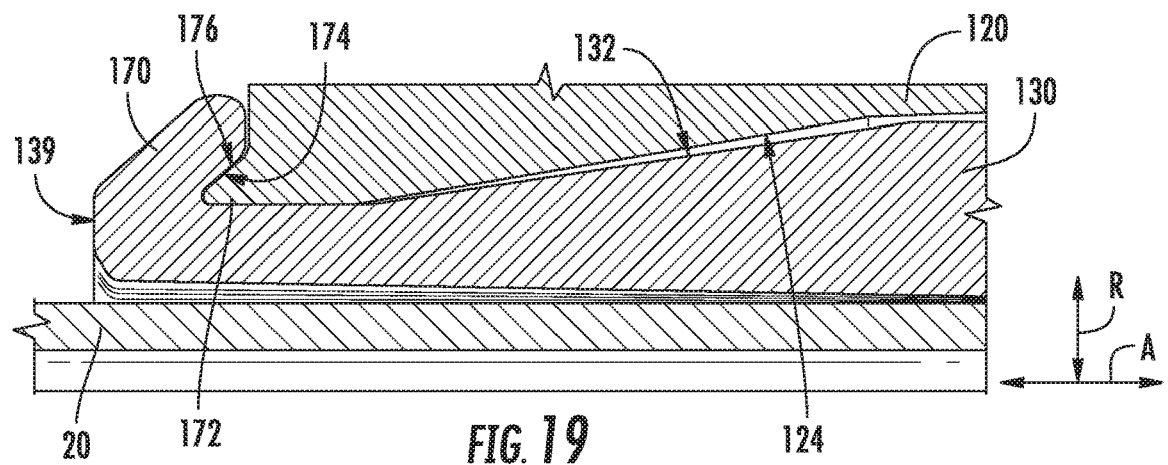
FIG. 19 is a partial section view of the collar and collet of the example quick connect fitting of FIG. 18.

With reference to FIGS. 16 through 19, quick connect fitting 100 may include features for assisting with removal of quick connect fitting 100 from water line 20. As shown in FIGS. 16 and 17, distal end portion 139 of each latching arm 136 may have a release hook 170, and collar 120 may having an annular projection 172. Annular projection 172 may be positioned opposite threaded end 112 of chuck 110 along the axial direction A. Each release hook 170 may also have a sloped surface 174, and annular projection 172 may also have a sloped surface 176. Sloped surfaces 174 of release hooks 170 may face annular projection 172 along the axial direction A. In particular, sloped surfaces 174 of release hooks 170 may face sloped surface 176 of annular projection 172 along the axial direction A.

Annular projection 172 may be spaced from release hooks 170 along the axial direction A when collar 120 is threaded onto chuck 110. In addition, annular projection 172 may be spaced from latching arms 136 along the radial direction R when collar 120 is threaded onto chuck 110. Conversely, annular projection 172 engage with release hooks 170 as collar 120 is unthreaded from chuck 110. In particular, turning to FIGS. 18 and 19, sloped surface 176 of annular projection 172 engages with sloped surface 174 of release hook 170 on each latching arm 136 to lift latching arms 136 from water line 20 as collar 120 is dismounted from chuck 110. With latching arms 136 lifted from water line 20, collet 130 may slide more freely along the axial direction A as collar 120 is unthreaded from chuck 110. Thus, as collar 120 continues to be unthreaded from chuck 110, collet 130 may slide along the axial direction A on water line 20 away from chuck 110.

FIG. 20 is an exploded section view of a quick connect fitting 200 according to another example embodiment of the present subject matter. FIG. 21 is a section view of quick connect fitting 200. Quick connect fitting 200 has numerous common components and function in the same or similar manner to that described above for quick connect fitting 100. Thus, except as noted below, the description of quick connect fitting 100 provided above is applicable to quick connect fitting 200.

As may be seen in FIG. 20, water line 20 may be cut to form a gap 24 between ends 22 of water line 20. Quick connect fitting 200 may be fitted between ends 22 of water line 20 to bridge the gap 24 between ends 22 of water line 20. To allow insertion of chuck 110 between ends 22 of water line 20, a first portion 212 of a first opening 210 within chuck 110 (e.g., first portion 150 of inlet 119) is longer along the axial direction A than a first portion 222 of a second opening 220 within chuck 110. Thus, one end 22 of water line 20 may be completely inserted into first portion 212 of first opening 210 to allow insertion of the opposite end 22 of water line 20 into first portion 222 of second opening 220. In such a manner, chuck 110 may be installed to bridge the gap 24 between ends 22 of water line 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A quick connect fitting kit, comprising:
a chuck having a threaded end, the chuck defining a channel;
a collar having a threaded end and a sloped inner surface, the threaded end of the collar meshable with the threaded end of the chuck to mount the collar to the chuck; and
a collet having a sloped outer surface, the collet positioned within the collar such that the sloped outer surface of the collet is positioned on the sloped inner surface of the collar, the collet defining a passage, the passage of the collet sized for receipt of a pipe, the pipe in fluid communication with the channel of the chuck when the collet is compressed against the pipe and the collar is mounted to the chuck,
wherein the collet has a plurality of latching arms and an annular body, the plurality of latching arms extending axially from the annular body, a distal end portion of each of the plurality of latching arms having a release hook disposed outside of the collar and the chuck, the collar having an annular projection, the annular projection engaging the release hook on each of the plurality of latching arms to lift the plurality of latching arms from the pipe when the collar is dismounted from the chuck, and
wherein the release hook on each of the plurality of latching arms has a sloped surface that faces a sloped surface of the annular projection on the collar.

2. The quick connect fitting kit of claim 1, wherein an inlet of the channel is positioned radially inward of the threaded end of the chuck, a first portion of the inlet of the channel having a diameter corresponding to the pipe, the pipe received within the first portion of the inlet of the channel when the collar is mounted to the chuck.

3. The quick connect fitting kit of claim 2, further comprising an O-ring, the O-ring positioned axially between the collet and the chuck when the collar is mounted to the chuck.

4. The quick connect fitting kit of claim 3, wherein a second portion of the inlet of the channel has a diameter that is greater than the pipe, the O-ring extending radially between the pipe and the second portion of the inlet of the channel when the collar is mounted to the chuck.

5. The quick connect fitting kit of claim 1, wherein the annular projection is positioned opposite the threaded end of the collar on the collar.

6. The quick connect fitting kit of claim 1, wherein the sloped outer surface of the collet is defined on the plurality of latching arms.

7. The quick connect fitting kit of claim 1, wherein the annular body is positioned against the chuck when the chuck is mounted to the collar.

8. The quick connect fitting kit of claim 1, wherein the threaded end of the collar has a thread on an inner surface of the collar, and the threaded end of the chuck has a thread on an outer surface of the chuck.

9. The quick connect fitting kit of claim 1, wherein the threaded end of the collar has a pair of threads on an inner surface of the collar, and the threaded end of the chuck has a pair of threads on an outer surface of the chuck.

10. The quick connect fitting kit of claim 1, wherein the collar has a plurality of feedback pins at the threaded end of the collar, the chuck has a post, and the post of the chuck clicks past the plurality of feedback pins as the collar mounts to the chuck for audible feedback.

11. The quick connect fitting kit of claim 1, wherein the threaded end of the collar is positioned opposite the sloped inner surface of the collar on the collar.

12. A quick connect fitting kit, comprising:
a chuck having a threaded end, the chuck defining a channel;
a collar having a threaded end and a sloped inner surface, the threaded end of the collar meshable with the threaded end of the chuck to mount the collar to the chuck, the threaded end of the collar axially spaced from the sloped inner surface of the collar within the collar; and
a collet having a sloped outer surface, the collet positioned within the collar such that the sloped outer surface of the collet is positioned on the sloped inner surface of the collar, the collet defining a passage, the passage of the collet sized for receipt of a pipe, the pipe in fluid communication with the channel of the chuck when the collet is compressed against the pipe and the collar is mounted to the chuck,
wherein the collet has a plurality of latching arms and an annular body, the plurality of latching arms extending axially from the annular body, a distal end portion of each of the plurality of latching arms having a release hook disposed outside of the collar and the chuck, the collar having an annular projection, the annular projection engaging the release hook on each of the plurality of latching arms to lift the plurality of latching arms from the pipe when the collar is dismounted from the chuck, and wherein the release hook on each of the plurality of latching arms has a sloped surface that faces a sloped surface of the annular projection on the collar.

13. The quick connect fitting kit of claim 12, further comprising an O-ring, an inlet of the channel positioned radially inward of the threaded end of the chuck, a first portion of the inlet of the channel having a diameter corresponding to the pipe, the pipe received within the first portion of the inlet of the channel when the collar is mounted to the chuck, the O-ring positioned axially between the collet and the chuck when the collar is mounted to the chuck.

14. The quick connect fitting kit of claim 13, wherein a second portion of the inlet of the channel has a diameter that is greater than the pipe, the O-ring extending radially between the pipe and the second portion of the inlet of the channel when the collar is mounted to the chuck.

15. The quick connect fitting kit of claim 12, wherein the annular projection is positioned opposite the threaded end of the collar on the collar, the sloped outer surface of the collet is defined on the plurality of latching arms, and the annular body is positioned against the chuck when the chuck is mounted to the collar.

16. The quick connect fitting kit of claim 12, wherein the threaded end of the collar has at least one thread on an inner surface of the collar, and the threaded end of the chuck at least one thread on an outer surface of the chuck.

17. The quick connect fitting kit of claim 12, wherein the collar has a plurality of feedback pins at the threaded end of the collar, the chuck has a post, and the post of the chuck clicks past the plurality of feedback pins as the collar mounts to the chuck for audible feedback.

\* \* \* \* \*